(12) United States Patent
Ma et al.

(10) Patent No.: US 8,544,515 B2
(45) Date of Patent: *Oct. 1, 2013

(54) ULTRALIGHTWEIGHT RUNFLAT TIRES BASED UPON NEGATIVE POISSON RATIO (NPR) AUXETIC STRUCTURES

(75) Inventors: Zheng-Dong Ma, Ann Arbor, MI (US); Yuanyuan Liu, Ann Arbor, MI (US); Xiaoming Liu, Ann Arbor, MI (US); Ce Sun, Ann Arbor, MI (US); Yushun Cui, Ann Arbor, MI (US)

(73) Assignee: MKP Structural Design Associates, Inc., Dexter, MI (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/964,942

(22) Filed: Dec. 10, 2010

(65) Prior Publication Data
US 2011/0168313 A1 Jul. 14, 2011

Related U.S. Application Data

(63) Continuation-in-part of application No. 12/267,867, filed on Nov. 10, 2008, now Pat. No. 7,910,193.

(51) Int. Cl.
*B60C 5/00* (2006.01)
*B60C 17/00* (2006.01)

(52) U.S. Cl.
USPC ............ 152/450; 152/151; 152/152; 152/516

(58) Field of Classification Search
USPC .................................. 152/151, 152, 450, 516
See application file for complete search history.

(56) References Cited

U.S. PATENT DOCUMENTS

| | | | |
|---|---|---|---|
| 4,668,557 A | 5/1987 | Lakes | |
| 5,855,597 A | 1/1999 | Jayaraman | |
| 6,997,944 B2 | 2/2006 | Harrison et al. | |
| 7,160,621 B2 | 1/2007 | Chaudhari et al. | |
| 2006/0265052 A1 | 11/2006 | You | |
| 2007/0213838 A1* | 9/2007 | Hengelmolen | 623/23.71 |
| 2010/0119792 A1* | 5/2010 | Ma | 428/218 |
| 2011/0240190 A1* | 10/2011 | Summers et al. | 152/151 |

* cited by examiner

*Primary Examiner* — Justin Fischer
(74) *Attorney, Agent, or Firm* — Gifford, Krass, Sprinkle, Anderson & Citkowski, P.C.

(57) ABSTRACT

Negative Poisson's ratio (NPR) or auxetic are used to make lightweight wheels and runflat tires. The NPR tires can be tailored and functionally-designed to optimally meet the runflat requirements for both military and commercial vehicles. NPR-runflat tires may be fabricated using standard materials and simple manufacturing processes, resulting in low-cost and high-volume production. In preferred embodiments the runflat tire designs are fully compatible with Central Tire Inflation Systems (CTIS), while providing a performance equivalent to current military vehicle solutions but at half the weight. An auxetic wheel according to the invention comprises a line defining an axis of rotation; and a plurality of concentric rings of unit cells surrounding the axis, each unit cell being constructed of a plurality of members defining a Negative Poisson's Ratio (NPR) structure. The outermost ring of unit cells is arranged to facilitate rolling terrain contact, such that the stiffness of the structure in the localized region of loading due to terrain contact increases as the wheel rotates. A layer of material may be disposed between the concentric rings of unit cells which in preferred embodiments comprise a plurality of nested-V shapes. A cover may be provided over the outermost ring of unit cells forming a tire which may, or may not, be inflated.

8 Claims, 22 Drawing Sheets

Quasi-3D N-tire

3D N-Tire

Three-layered configuration
(N=28)

Two-layered configuration
(N=20)

1320

ULTRALIGHTWEIGHT RUNFLAT TIRES BASED UPON NEGATIVE POISSON RATIO (NPR) AUXETIC STRUCTURES

REFERENCE TO RELATED APPLICATION

This application is a continuation-in-part of U.S. patent application Ser. No. 12/267,867, filed Nov. 10, 2008, the entire content of which is incorporated herein by reference.

FIELD OF THE INVENTION

This invention relates generally to negative Poisson's ratio (NPR) or auxetic structures and, in particular, to lightweight, runflat tires based upon such structures.

BACKGROUND OF THE INVENTION

Commercial technologies developed for vehicular "runflat" or "airless" tires include Michelin's Tweels and Resilient Technologies' "non-pneumatic tire." Both of these use a honeycomb configuration for consumer applications. Runflat technology is also important to military applications. A representative military vehicle may impose 10,000 lbs of vehicle load per tire. To enable the vehicle to operate after tires are perforated by terrain or gunfire damage, passive runflat systems are employed inside the tire. The runflats currently found on the military vehicle are designed to provide mobility for a short time after a tire goes flat, but weigh approximately 100 lbs per tire. In addition to runflat technology, the vehicle utilizes a central tire inflation system (CTIS) to operate effectively across different terrain conditions.

Poisson's ratio (v), named after Simeon Poisson, is the ratio of the relative contraction strain, or transverse strain (normal to the applied load), divided by the relative extension strain, or axial strain (in the direction of the applied load). Some materials, called auxetic materials, have a negative Poisson's ratio (NPR). If such materials are stretched (or compressed) in one direction, they become thicker (or thinner) in perpendicular directions.

NPR materials have attracted significant interest due to their unique behaviors. Unlike conventional materials, a NPR material may shrink when compressed along a perpendicular direction. One result of this behavior is that the material can concentrate itself under the compressive load to better resist the load. Thus, a NPR material becomes stiffer and stronger as the amplitude of the load increases. It has also been found that NPR can improve material/structural properties, including enhanced thermal/shock resistance, fracture toughness, indentation resistance and shear modulus. [1-3].

Auxetic and NPR structures have been used in a variety of applications. According to U.S. Pat. No. 7,160,621, an automotive energy absorber comprises a plurality of auxetic structures wherein the auxetic structures are of size greater than about 1 mm. The article also comprises at least one cell boundary that is structurally coupled to the auxetic structures. The cell boundary is configured to resist a deformation of the auxetic structures.

The vast majority of auxetic structures are polymer foams. U.S. Pat. No. 4,668,557, for example, discloses an open cell foam structure that has a negative Poisson's ratio. The structure can be created by triaxially compressing a conventional open-cell foam material and heating the compressed structure beyond the softening point to produce a permanent deformation in the structure of the material. The structure thus produced has cells whose ribs protrude into the cell resulting in unique properties for materials of this type.

SUMMARY OF THE INVENTION

This invention relates generally to negative Poisson's ratio (NPR) or auxetic structures and, in particular, to lightweight wheels and runflat tires based upon such structures. The NPR tires can be tailored and functionally-designed to optimally meet the runflat requirements for both military and commercial vehicles. NPR-runflat tires may be fabricated using standard materials and simple manufacturing processes, resulting in low-cost and high-volume production. In preferred embodiments the runflat tire designs are fully compatible with Central Tire Inflation Systems (CTIS), while providing a performance equivalent to current military vehicle solutions but at half the weight.

An auxetic wheel according to the invention comprises a line defining an axis of rotation; and a plurality of concentric rings of unit cells surrounding the axis, each unit cell being constructed of a plurality of members defining a Negative Poisson's Ratio (NPR) structure. The outermost ring of unit cells is arranged to facilitate rolling terrain contact, such that the stiffness of the structure in the localized region of loading due to terrain contact increases as the wheel rotates.

A layer of material may be disposed between the concentric rings of unit cells which in preferred embodiments comprise a plurality of nested-V shapes. A cover may be provided over the outermost ring of unit cells forming a tire which may, or may not, be inflated.

BRIEF DESCRIPTION OF THE DRAWINGS

FIG. 13-*b* shows another special N-tire configuration (with 3 layers) with positive Poisson's ratio (PPR) in this configuration;

DETAILED DESCRIPTION OF THE INVENTION

This invention is directed to the use of Negative Poisson's Ratio (NPR) materials, also known as auxetic materials, to produce runflat or airless tires. It is believed that NPR materials provide improved stiffness/weight and survivability, compared to honeycomb, foam, or other cellular materials. Because the stiffening behavior of certain NPR structures is retained under nonlinear, large deformation responses and it can be functionally tailored, a runflat tire system based upon such materials should provide performance responses similar to pneumatic tire. This disclosure includes the underlying structures, finished tires based upon the technology, and manufacturing methods.

Commonly assigned U.S. patent application Ser. No. 12/267,867, the entire content of which is incorporated herein by reference, describes two- and three-dimensional NPR structures/materials and applications. The negative Poisson ratio effect causes the surrounding material to concentrate into the local area of loading. Consequently, the material becomes stiffer and stronger in the area of the applied load. Moreover, this stiffening behavior is retained under nonlinear, large deformation response.

Figure 1:
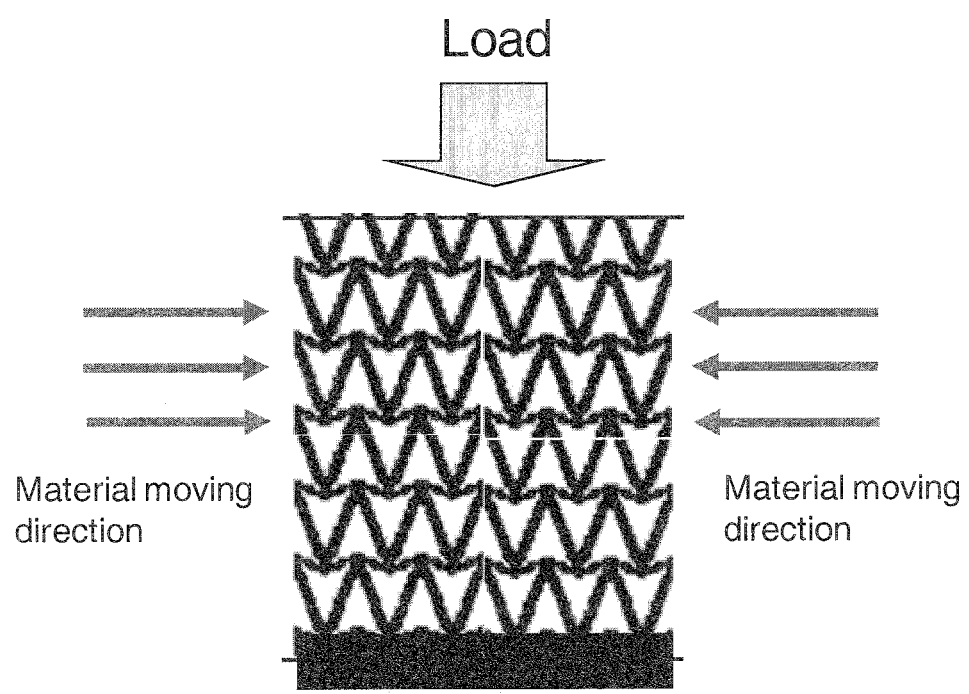
FIG. 1 illustrates a reactive shrinking mechanism, obtained through a topology optimization process.

NPR structures can react differently under different applied loads. Three unique features of NPR systems include: a) material concentration, b) bulging effect, and c) impact force mitigation. FIG. 1 illustrates a reactive shrinking mechanism of a NPR material. The unique property of this structure, which includes a plurality of "nested-V" shapes, is that it will shrink in two directions if compressed in one direction. When the structure is under a compressive load on the top of the structure, more material is gathered together under the load so that the structure becomes stiffer and stronger in the local area to resist against the load.

Figure 2:
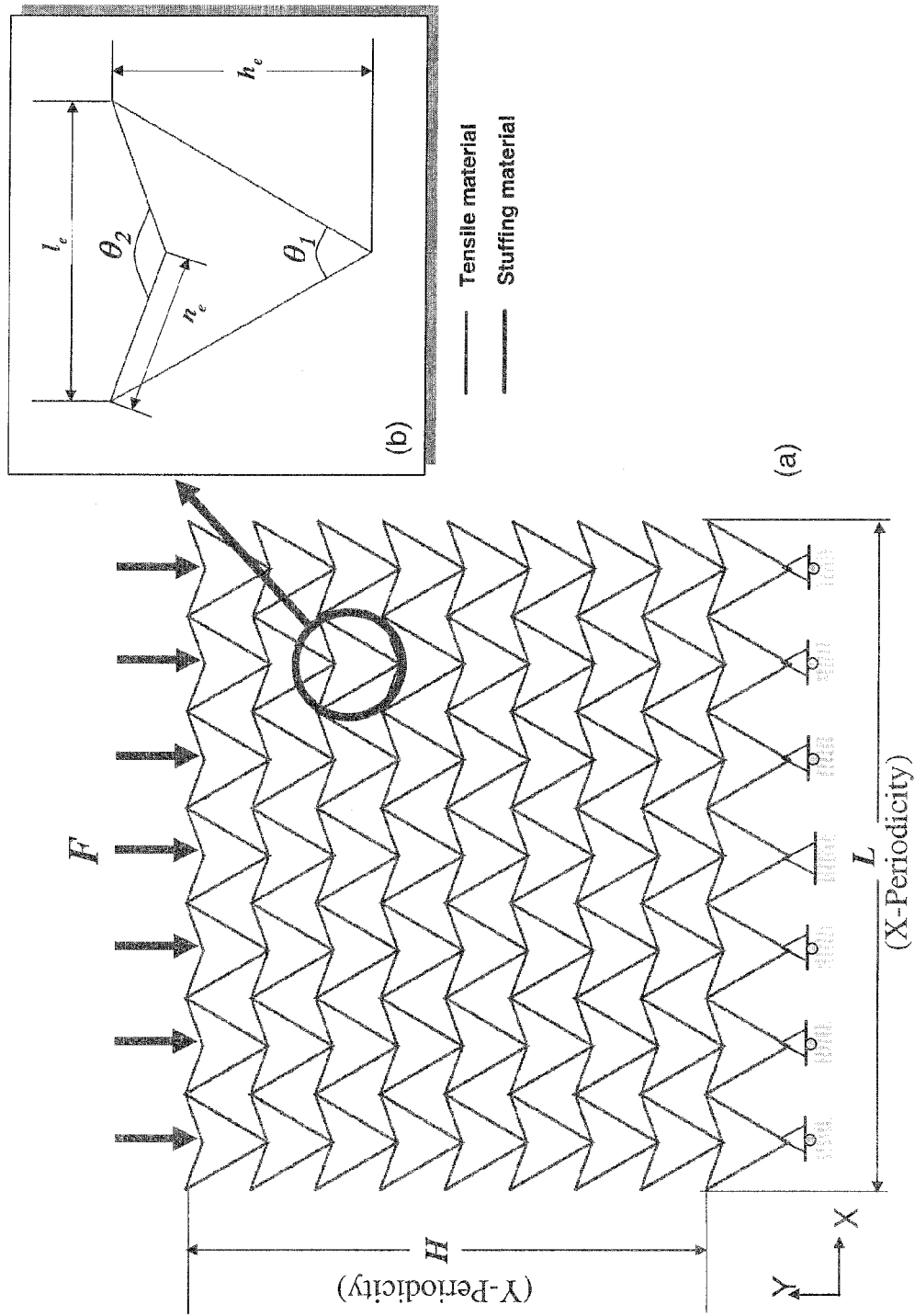
FIG. 2 illustrates design variables associated with a particular negative Poisson ratio (NPR) material.

FIG. 2 illustrates a negative Poisson's ratio (NPR) structure having a unit cell with three design variables, $n_e$, $l_e$, and $h_e$, which can be varied to obtain required material properties and functional performance. A nonlinear finite element method has been developed with a multi-step linearized analysis method to predict nonlinear behavior of this material and more advanced numerical methods and readily to be implemented. Effective material properties, such as Young's modulus, Poisson's ratio, material density, and load-bearing efficiency with respect to the design variables can then be calculated with consideration of the geometric nonlinear effect for any large load amplitudes.

Figure 3:
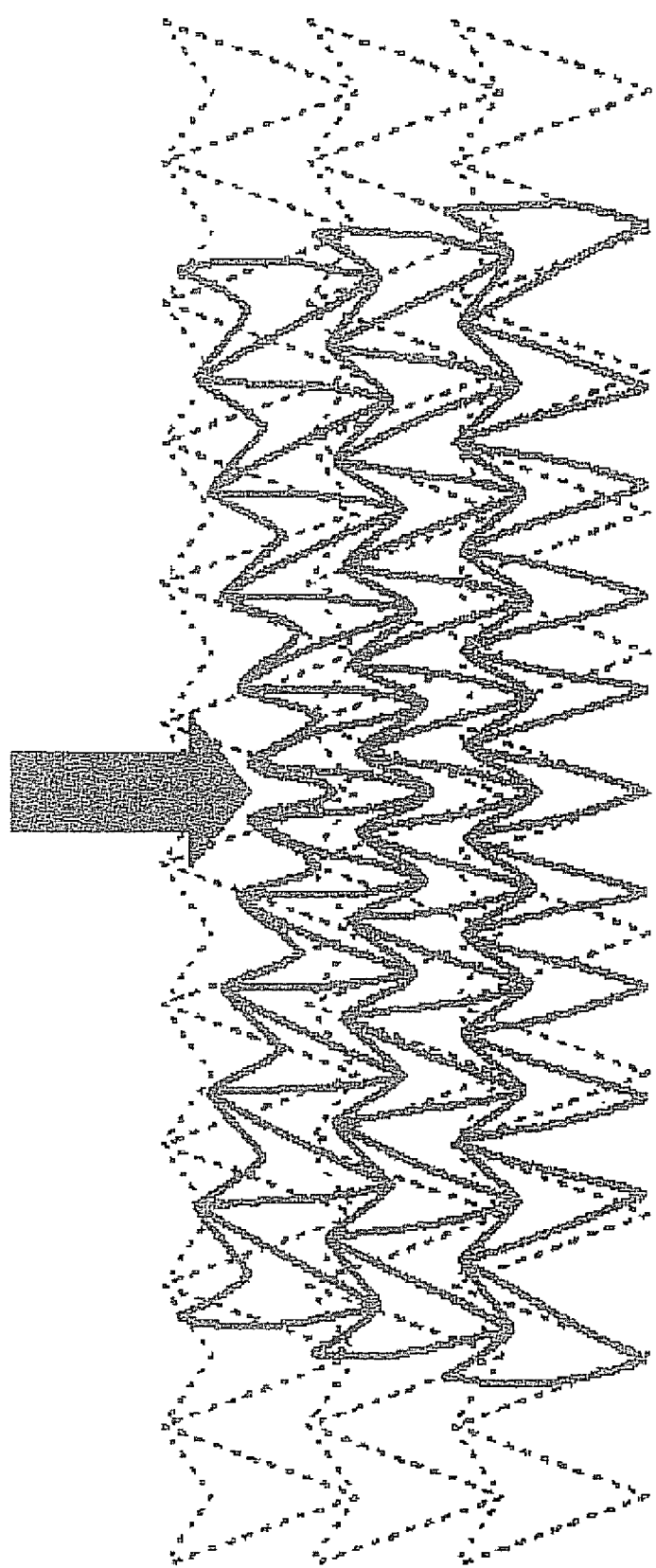
FIG. 3 illustrates the material of FIG. 2 will concentrate into the area where local load is applied so that it becomes stiffer and can better resist the load.

FIG. 3 illustrates how the NPR structure of FIG. 1 can be used in a typical application, wherein localized pressure is applied to an NPR structure. The original structure configuration is shown in dashed lines, and solid lines illustrate the deformed structure obtained from the simulation. As shown in the Figure, the surrounding material is concentrated into the local area due to the negative Poisson's ratio effect as the force is applied. Therefore the material becomes stiffer and stronger in the local area.

Figure 4:
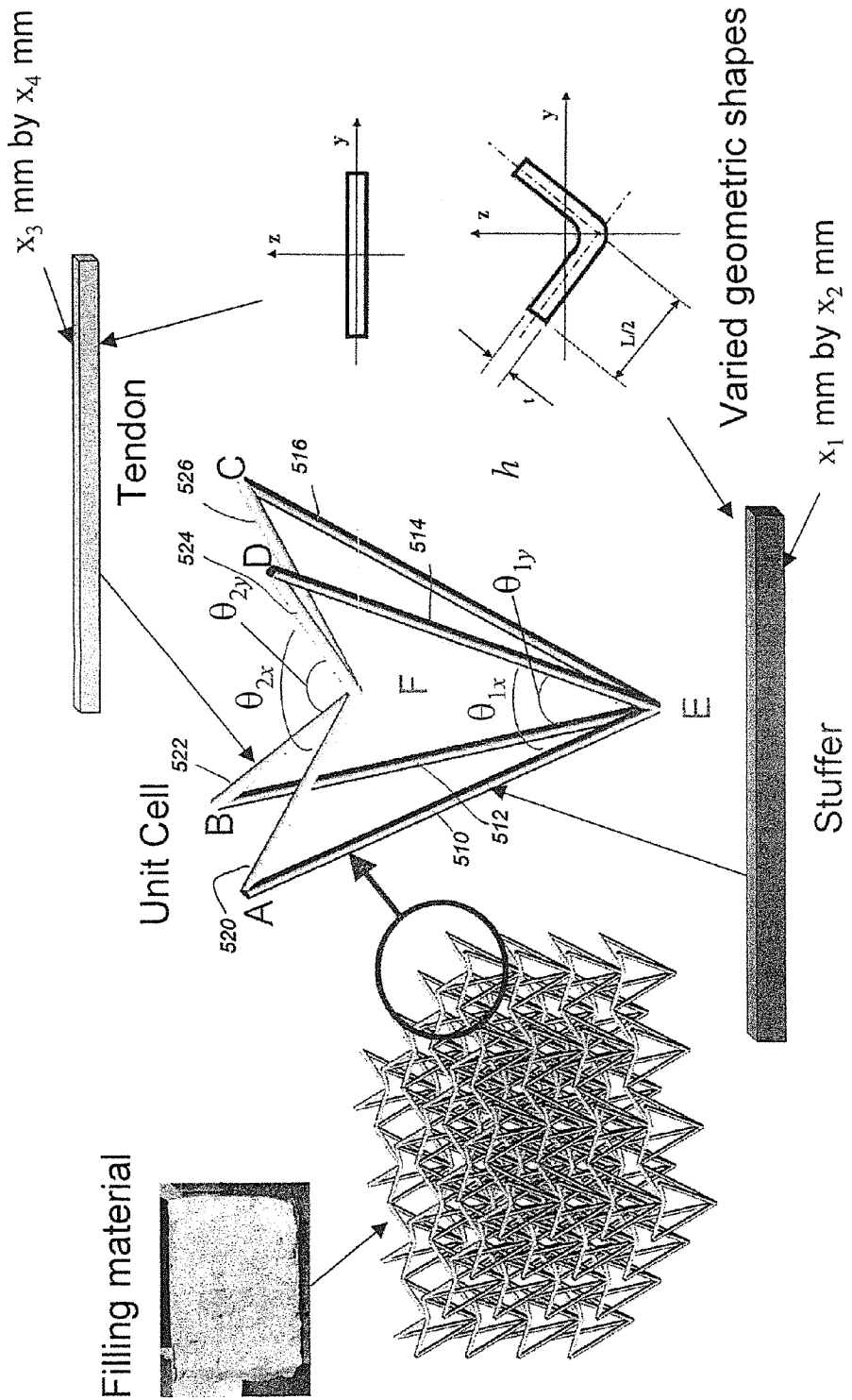
FIG. 4 shows how a plurality of horizontal layers may be stacked, with each point E of FIG. 4 in one horizontal layer being connected to a respective one of the points F of cells in an adjacent layer.

FIG. 4 shows how the shrinking mechanism can be extended to a three-dimensional auxetic structure. The structure is based upon a pyramid-shaped unit cell having four base points A, B, C, and D defining the corners of a square lying in a horizontal plane 502. Four stuffers 510, 512, 514, 516 of equal length extend from a respective one of the base points to a point E spaced apart from plane 502. Four tendons 520, 522, 524, 526 of equal length, but less than that of the stuffers, extend from a respective one of the base points to a point F between point E and the plane 502. According to one preferred embodiment, the angle formed between opposing stuffers from points A and C or B and D is on the order of 60 degrees, and the angle formed between opposing tendons from points A and C or B and D is on the order of 130 degrees, though other angles may be used. Design variables in the 2D and 3D NPR configurations can vary (in the range that has a physical meaning) to cover a wide range of material properties (including effective Young's modulus, Poisson's Ratios, yield stress etc. along different directions). Also, various raw materials can be used to make the NPR structure, which results in an even wider application range. While this and other structures disclosed herein depict points E and F positioned downwardly from the horizontal plane, it will be appreciated that the structure may be flipped over and produce the same NPR behavior or PPR behavior.

Figure 5A:
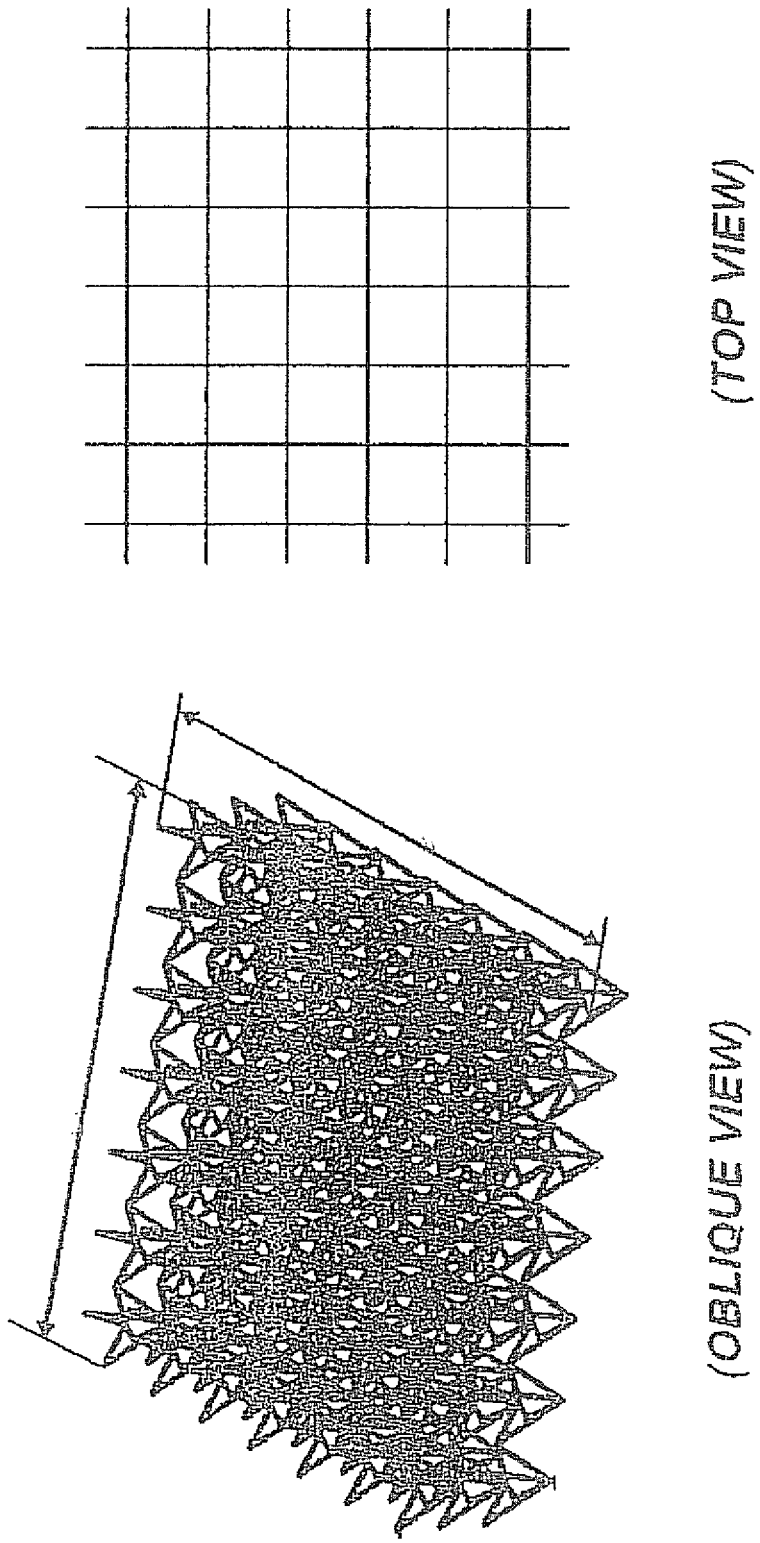
FIG. 5A is an example of a parallel-arranged 3D NPR structure.
Figure 5B:
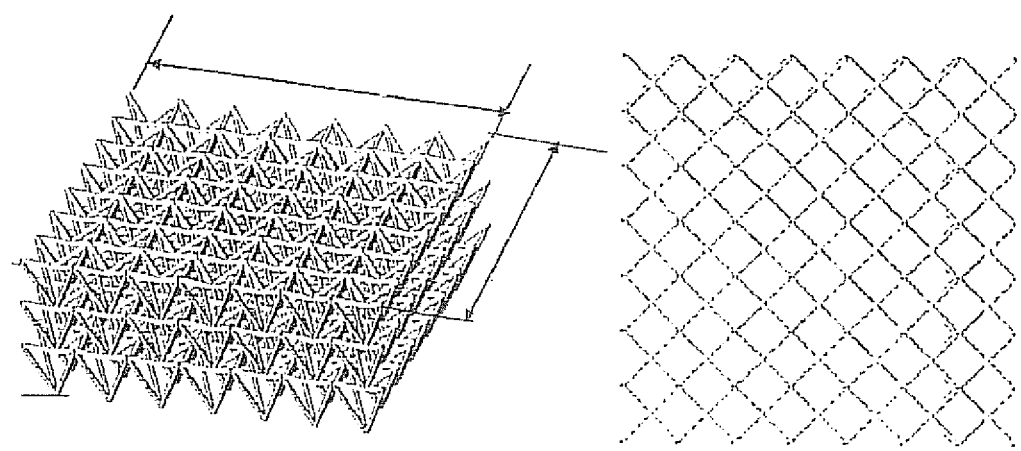
FIG. 5B is an example of a diagonally-arranged 3D NPR structure.

In a three-dimensional embodiment, a plurality of unit cells may be arranged as tiles in the same horizontal plane with the base points of each cell connected to the base points of adjoining cells, thereby forming a horizontal layer. A plurality of horizontal layers may then be stacked, with each point E of FIG. 4 in one horizontal layer being connected to a respective one of the points F of cells in an adjacent layer. Different three-dimensional NPR structures can be formed with the same unit cell but different arrangements of the unit cells. FIG. 5A is an example of a parallel-arranged 3D NPR structure, whereas FIG. 5B is an example of a diagonally-arranged 3D NPR structure. All v-angles in the (2D and 3D) unit cell can be replaced with a flat bottom to form a truncated v-shape.

Using the new design possibilities for three-dimensional designs, more advanced load-bearing NPR structures may be designed and tailored to a wide range of applications. In accordance with this invention, the ability to design 3D NPR materials having different effective material properties in different directions is exploited to produce NPR-based runflat tire systems wherein the vertical and lateral characteristics of the product can be tuned separately for best performance in both directions.

The NPR tires can be tailored and functionally-designed to optimally meet the runflat requirements for both military and commercial vehicles. NPR-runflat tires may be fabricated using standard materials and simple manufacturing processes, resulting in low-cost and high-volume production. In preferred embodiments the runflat tire designs are fully compatible with Central Tire Inflation Systems (CTIS), while providing a performance equivalent to current military vehicle solutions but at half the weight. Preliminary calculations of the NPR-runflat weight for the representative military vehicle is approximately 40 pounds.

Figure 6:
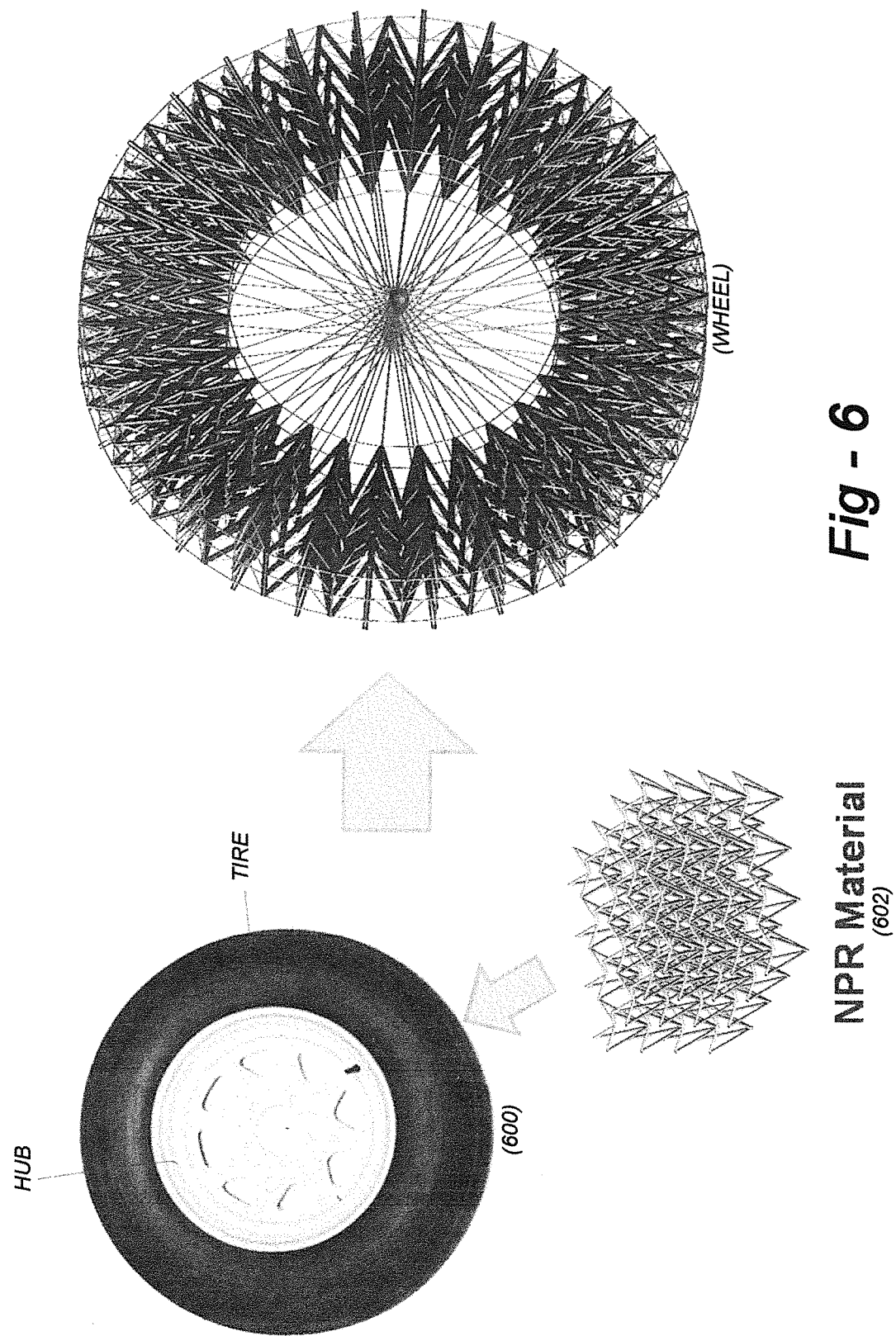
FIG. 6 illustrates how NPR material can be applied to a run-flat tire application called the "N-Tire."

FIG. 6 illustrates how NPR material can be applied to a run-flat tire application called the "N-Tire." In this embodiment, a 3-D structure 602 of the type depicted in FIGS. 4, 5 is arranged as concentric rings, disposed radially outwardly from a central axis. This and other embodiments disclosed herein may be covered with a suitable road-contacting material to produce a conventional-looking tire 600, or no covering may be provided for certain applications such as lunar or planetary rovers, undersea exploration vehicles, and the like. Also in all embodiments including an outer covering the resulting tire may be at atmospheric pressure or inflated with air, nitrogen or other gas(es).

Figure 7:
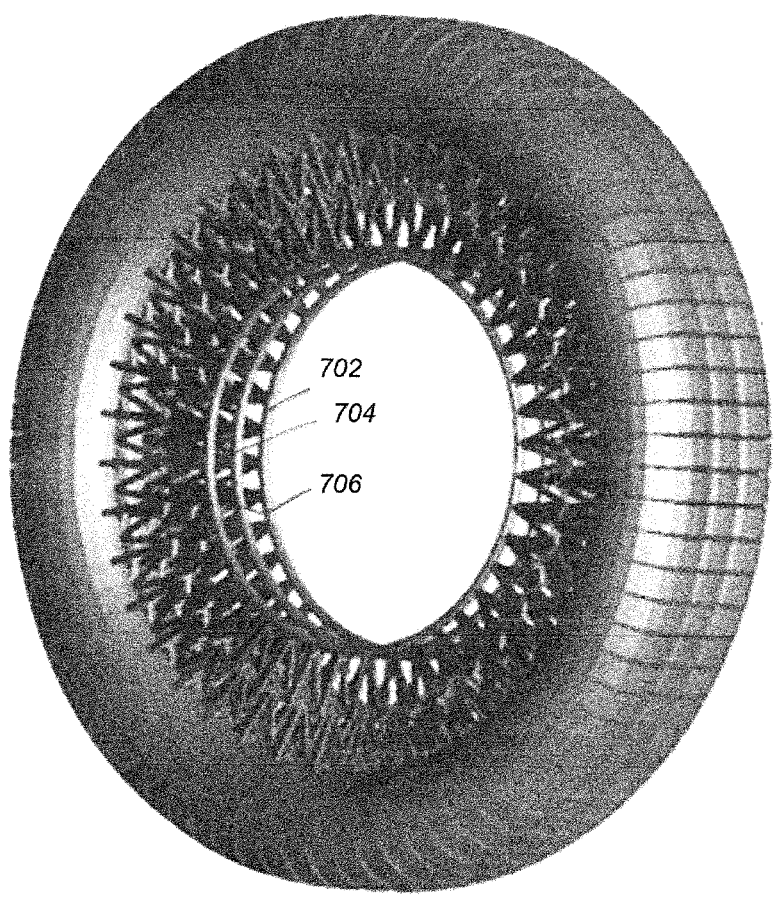
FIG. 7 illustrate the completed product with a portion of the outer covering removed to reveal the internal tendons and staffers.

FIG. 7 illustrate the completed product with a portion of the outer covering removed to reveal the internal tendons and stuffers. The stuffers and tendons may be made of any suitable rigid materials, including metals, ceramics, metal wires, fiber, metal matrix material or fiber-reinforced composite material, and plastics. According to one preferred embodiment, the stuffers are made of steel and tendons are made of aramid fibers, with the cross-sectional area of the tendons being less than the cross-sectional area of the stuffers. This particular configuration uses a plurality of rings separating each outward layer of unit cells (i.e., 702, 704, 706). As such, if a particular ring were removed and laid out flat, the structure would resemble that shown in FIG. 5A.

Figure 21:
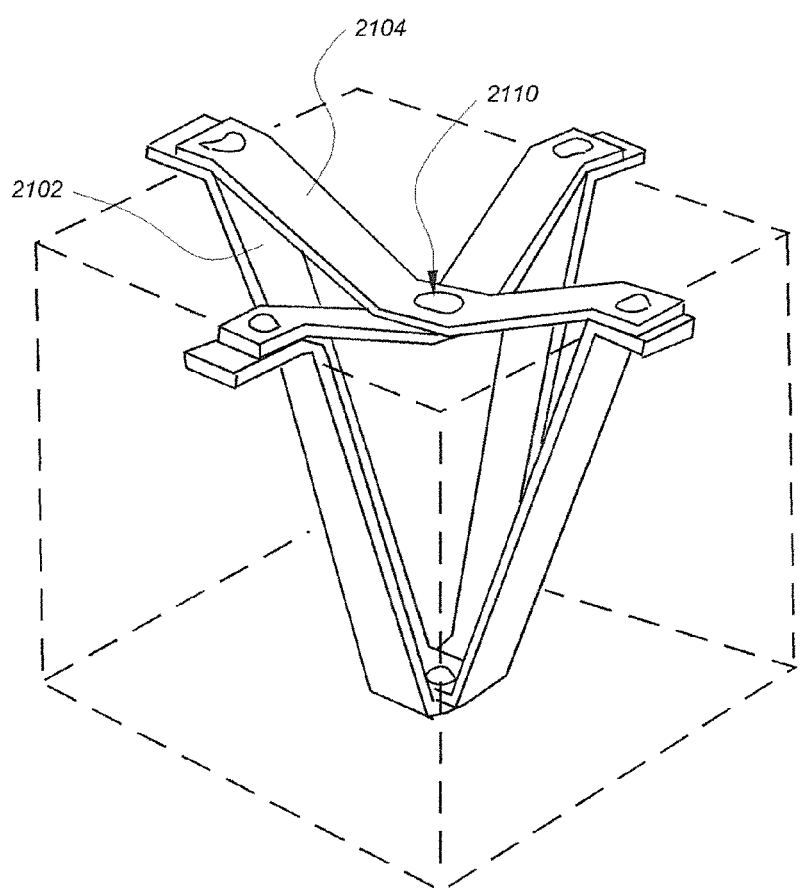
FIG. 21 shows how overlapping strips may be used to assist with manufacturing.

The staffers and/or tendons may be solid or hollow rods or other stock materials with any suitable cross-sectional geometry and/or wall thickness; flat or curved plates or strips; U-shaped, T-shaped, V-shaped or I-shaped beams, etc. For example, to assist with manufacturability, overlapping strips 2102, 2104 may be used to fabricate the unit cells as shown in FIG. 21. The V-shapes may have flat bottoms to bond with spot welding or adhesives in localized regions such as 2110.

Figure 8:
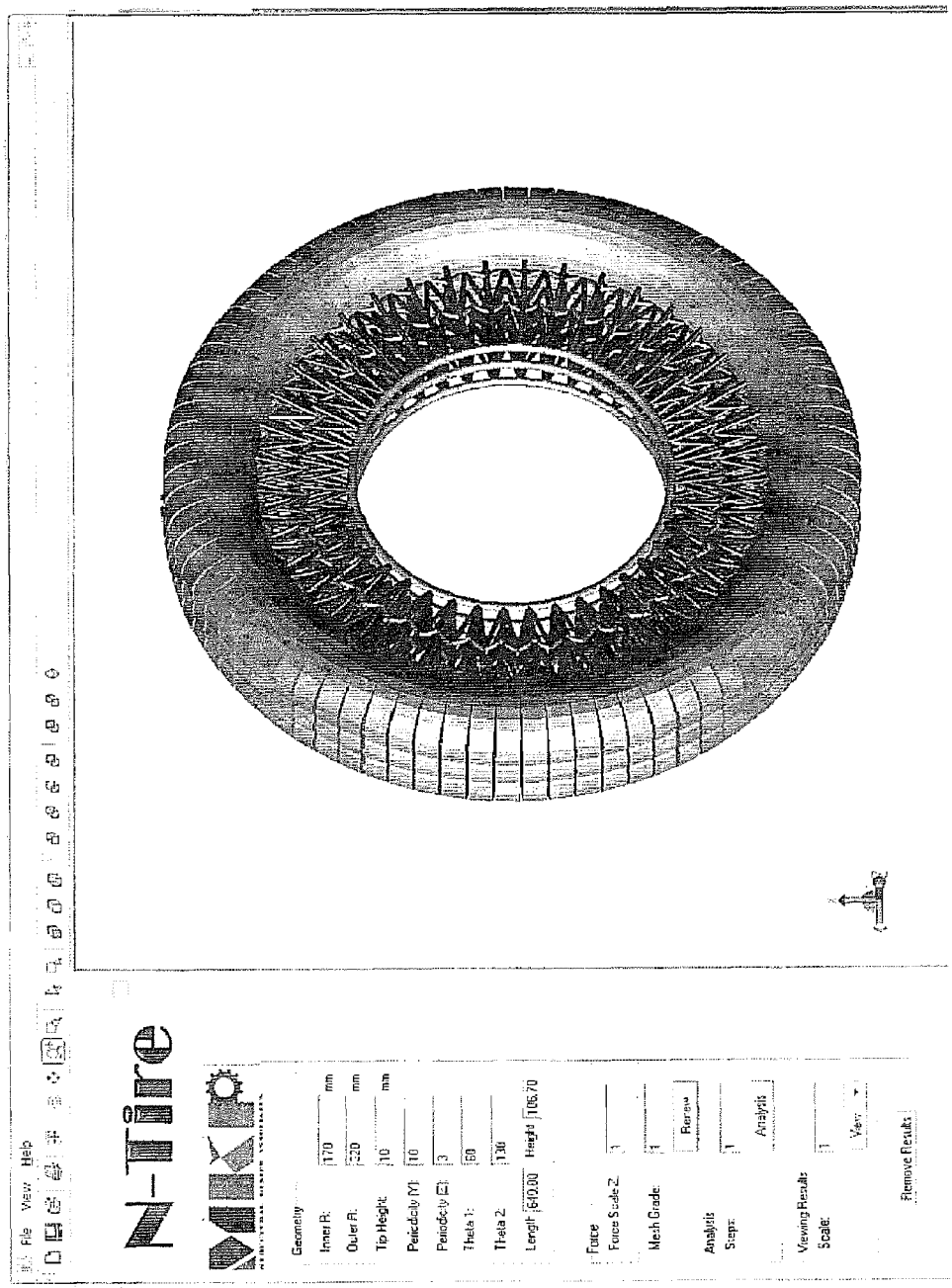
FIG. 8 illustrates a computer software application developed by MKP enabling the design and evaluation of NPR wheel structures.
Figure 9A:
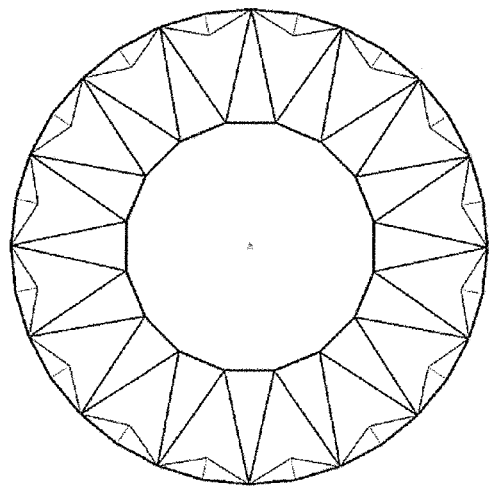
FIGS. 9a, b, c show variations of the NPR wheel structures, including three example 1, 2 and 3-layered structures.
Figure 9B:
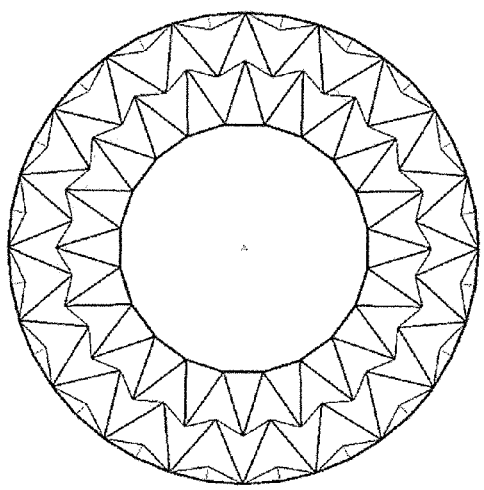
FIG. 9d illustrates a structure made entirely with NPR cells, resulting in a design that is effectively "hubless"
Figure 9C:
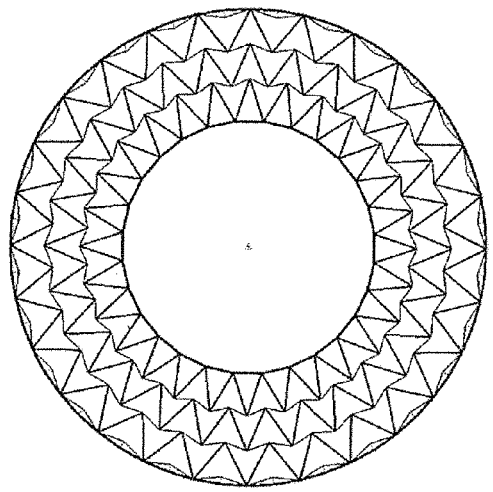
Figure 9D:
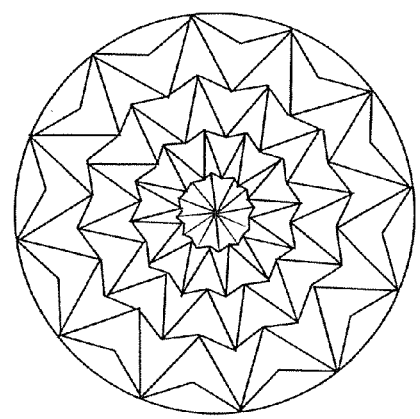
Figure 10:
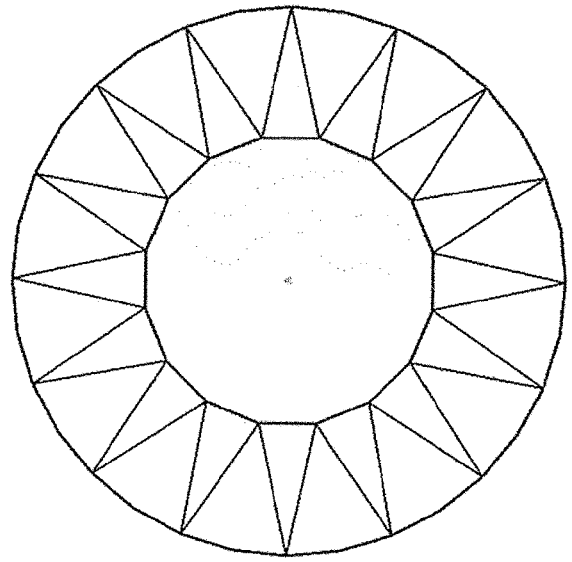
FIG. 10 depicts a one-layered N-tire and a simplified version of that design.
Figure 10:
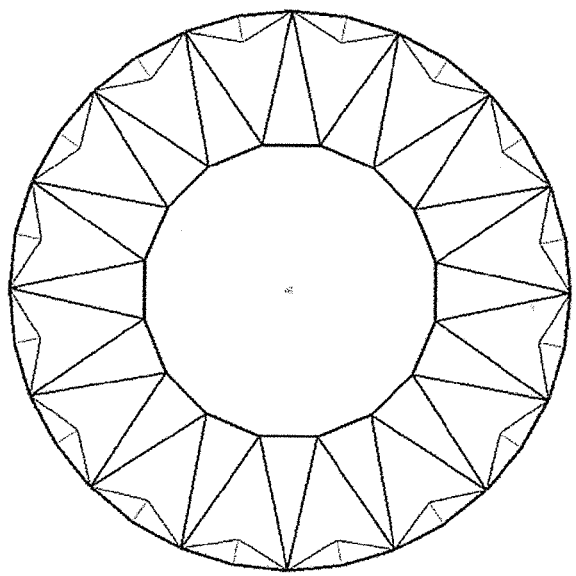
Figure 11:
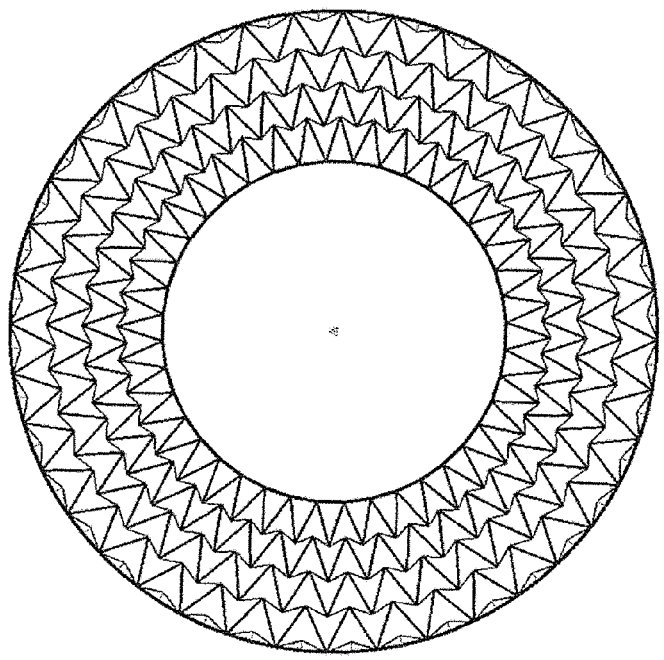
FIG. 11 illustrates an example variation in periodicity from N=28 to N=40.
Figure 11:
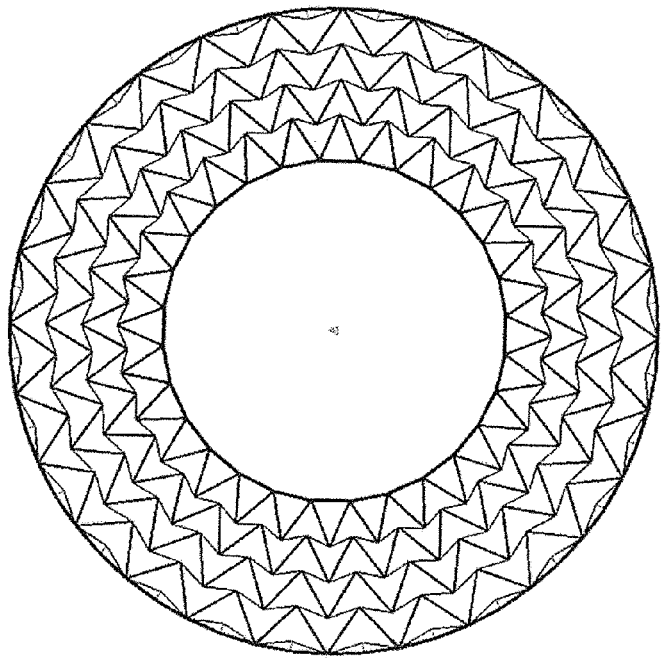

FIG. 8 illustrates a computer software application developed by MKP enabling the design and evaluation of NPR wheel structures. With this program, parameters may be varied to simulate results for different applications. Parameters include inner and outer diameter, tip height, periodicity in different dimensions, and angle between tendons and stuffers. FIGS. 9a, b, c, for example, show 1, 2 and 3-layered structures. FIG. 9d illustrates a structure made entirely with NPR cells, resulting in a design that is effectively "hubless." FIG. 10 depicts a one-layered N-tire and a simplified version of that design. FIG. 11 illustrates a variation in periodicity from N=28 to N=40. Note that function-oriented design is a unique feature of the NPR structure.

The actual number of the layers and periodicity will be determined based on the application. The periodicity may vary from layer to layer, as well as the "height" of each layer as measured radially outwardly from the central axis about which the structure rotates. The angles associated with the tendons and stuffers as defined in FIG. 4 may vary, particularly from layer to layer. The layers may also extend right down to the central axis, resulting in a structure without a hub.

The embodiments disclosed herein may adapted for various types of on- and off-road vehicles including, without limitation, bicycles, large and small cars and trucks, airplanes. In some cases such as bicycle or motorcycle applications, particularly the outermost layer may include a protruding rounded or dome shape to convert a cylindrical ground-contacting surface into more of a circular line.

Figure 12B:
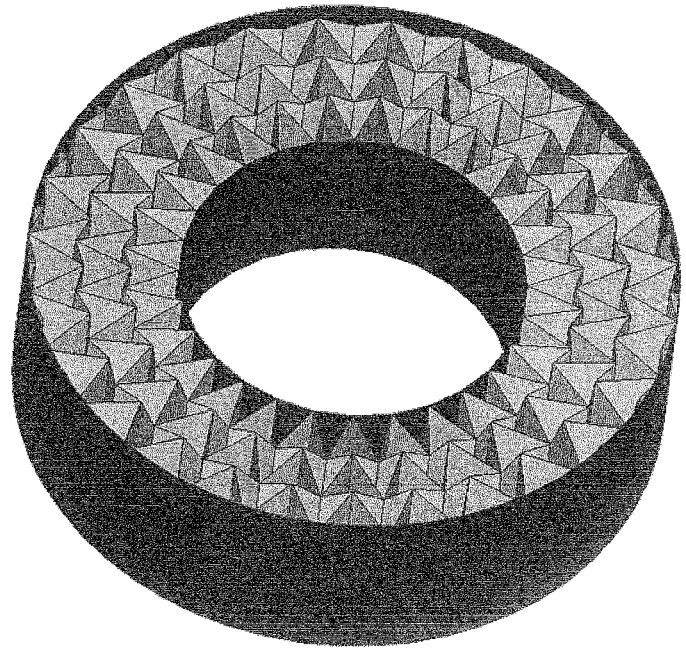
FIG. 12 illustrates various configurations of the NPR-Tire that can be generated using the N-Tire software, including: a) a true three-dimensional (3D) version, and b) a quasi-3D version of the NPR-Tire.
Figure 12A:
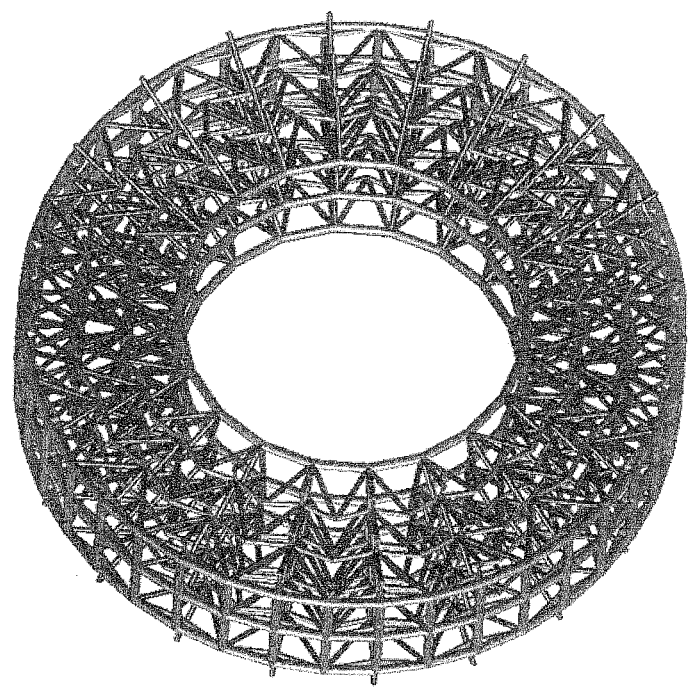

FIG. 12 illustrates various configurations of the NPR-Tire that can be generated using the N-Tire software, including: a) a true three-dimensional (3D) version of the NPR-Tire, and b) a quasi-3D version. Option b may use belts or rings of material between the concentric layers of unit cells. Such belts or rings may include rigid or semi-rigid sheets made of metal, ceramics or plastics. Mesh or woven materials made of natural or synthetic filaments or fabrics may alternatively be used. The option of FIG. 9b enables the tire carcass to perform normally, with the NPR-runflat system bearing increased load as the tire pressure drops below a specified critical level, such as completely flat or below the desired off-road nominal pressure.

Figure 13B:
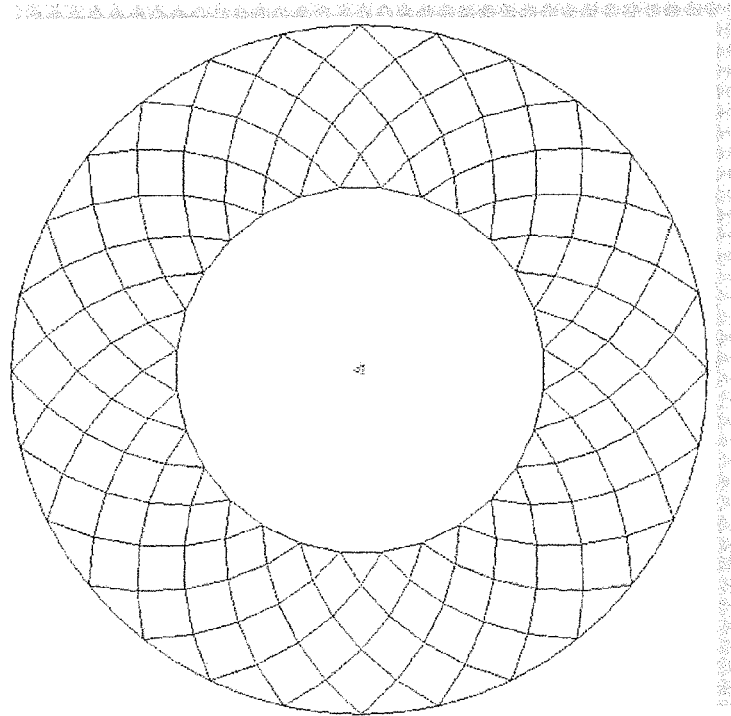
FIG. 13-*a* illustrates a two-layer N-tire configuration with positive Poisson's ratio (PPR) as a special case of the N-tire.
Figure 13A:
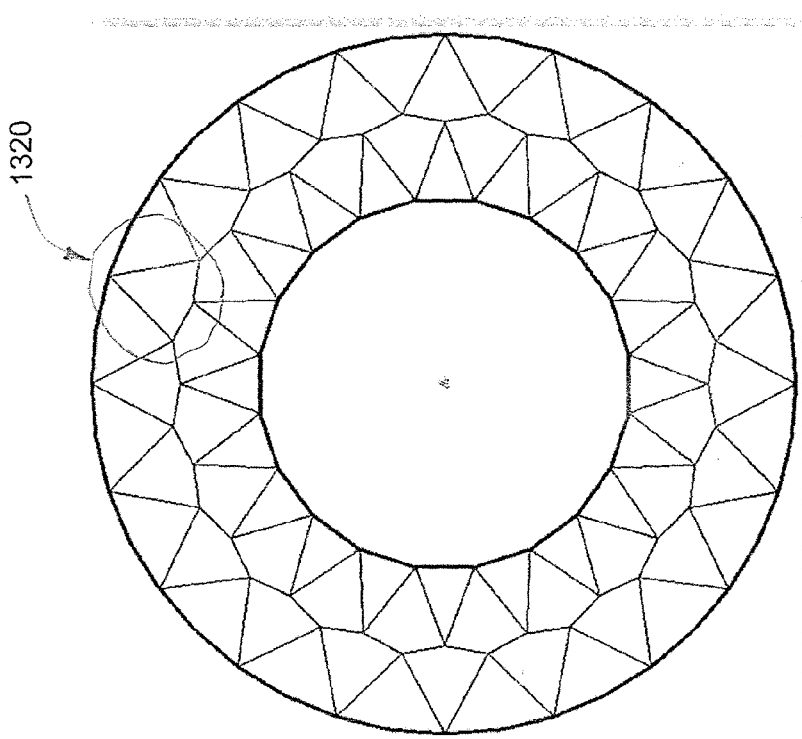
Figure 14:
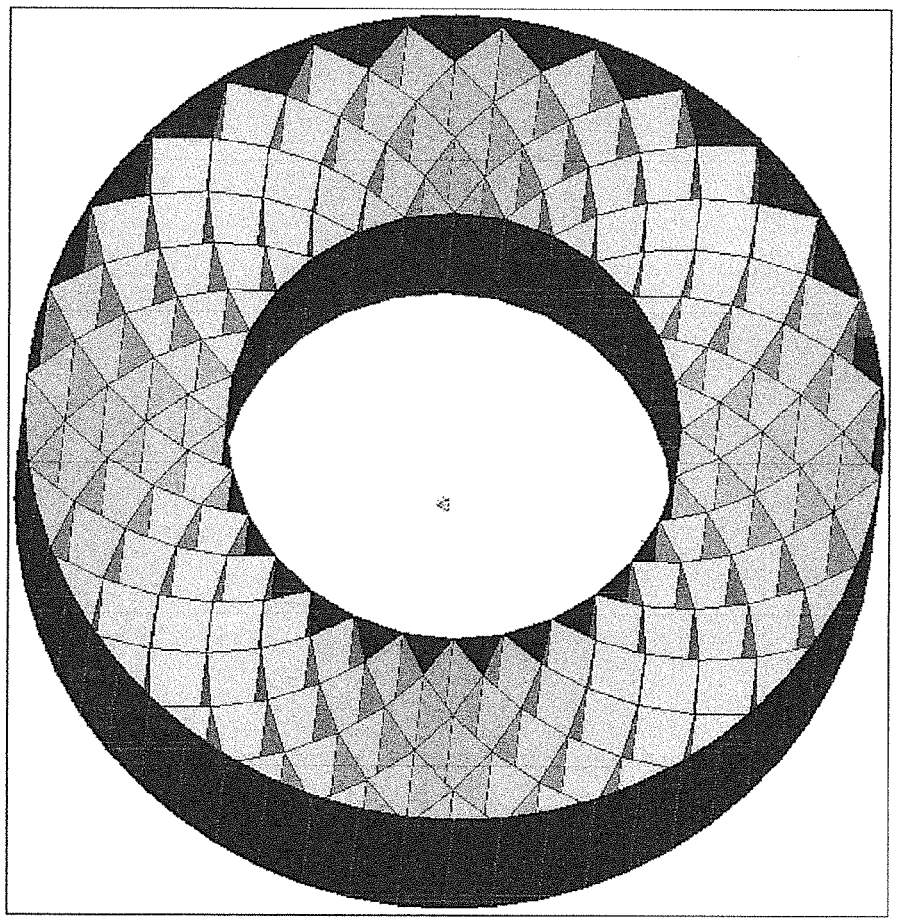
FIG. 14 is an oblique representation of the quasi-3D embodiment of FIG. 13.
Figure 15:
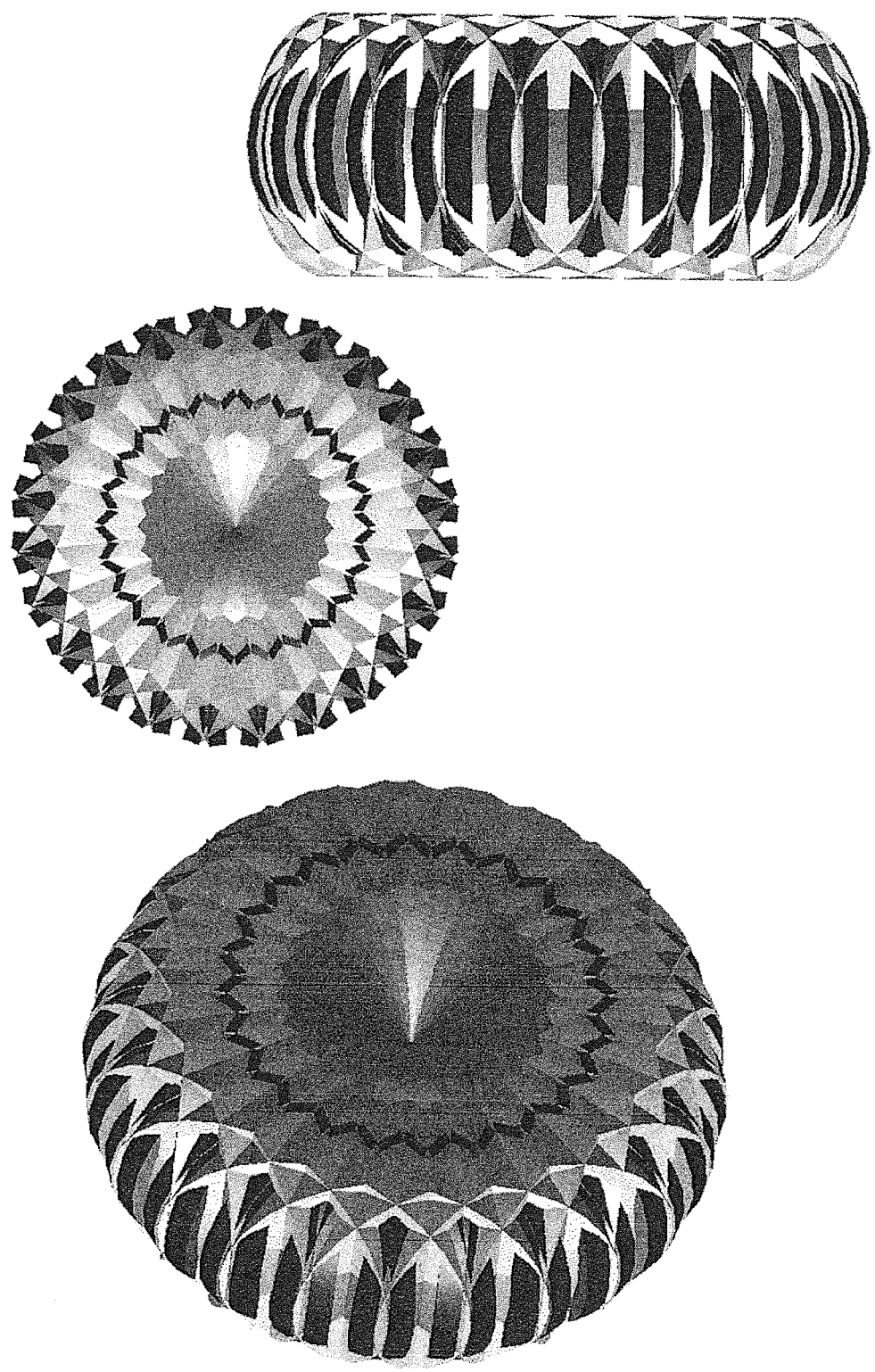
FIGS. 15, 16 and 17 illustrate even more advanced structures realized by varying the numbers of layers, periodicity, geometry, shapes of the tendons and stuffers to arrive at complex unit cell configurations.
Figure 16:
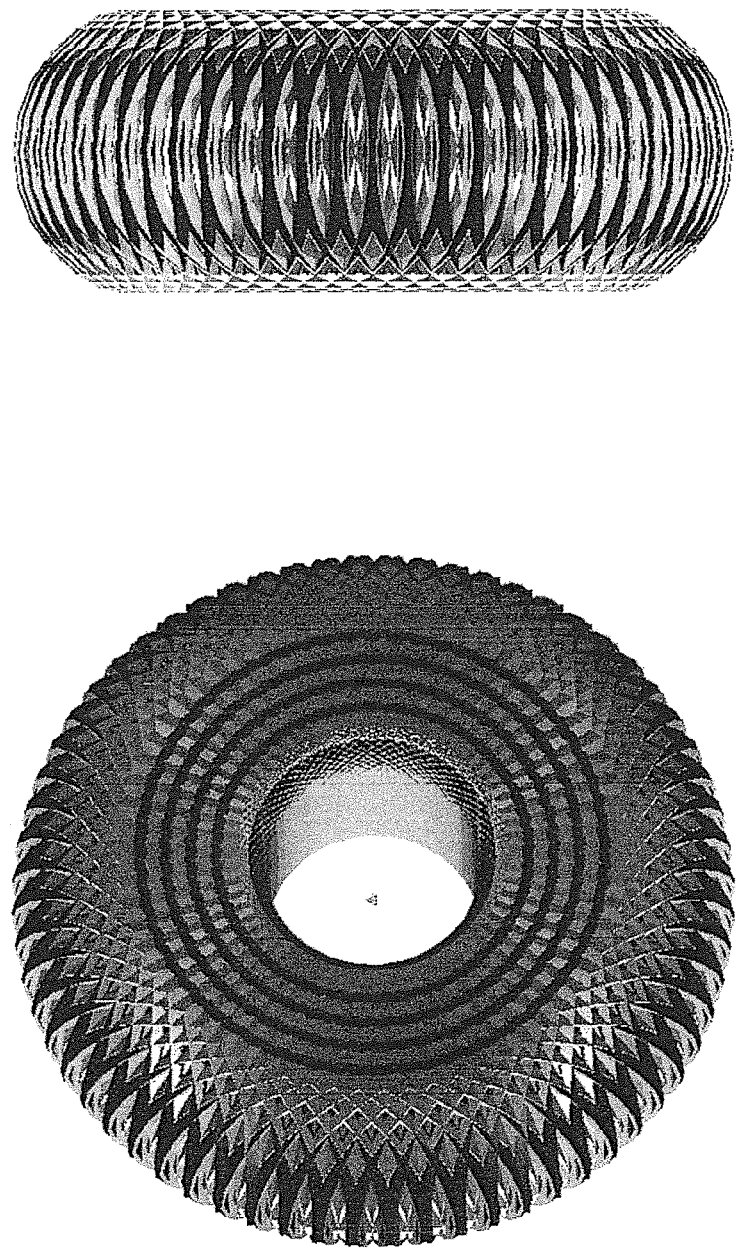
Figure 17:
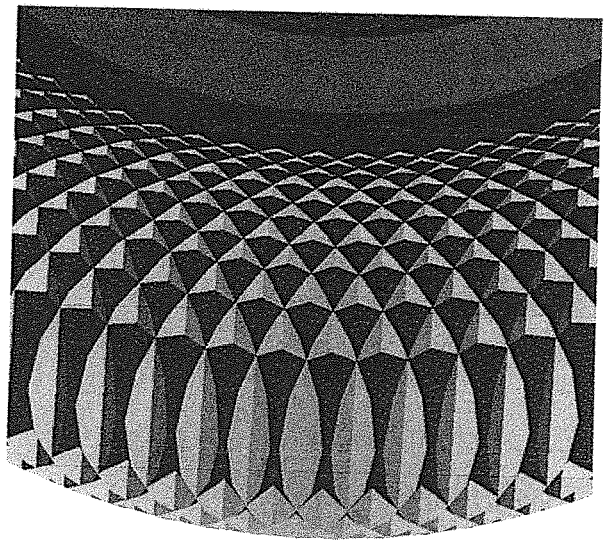
Figure 17:
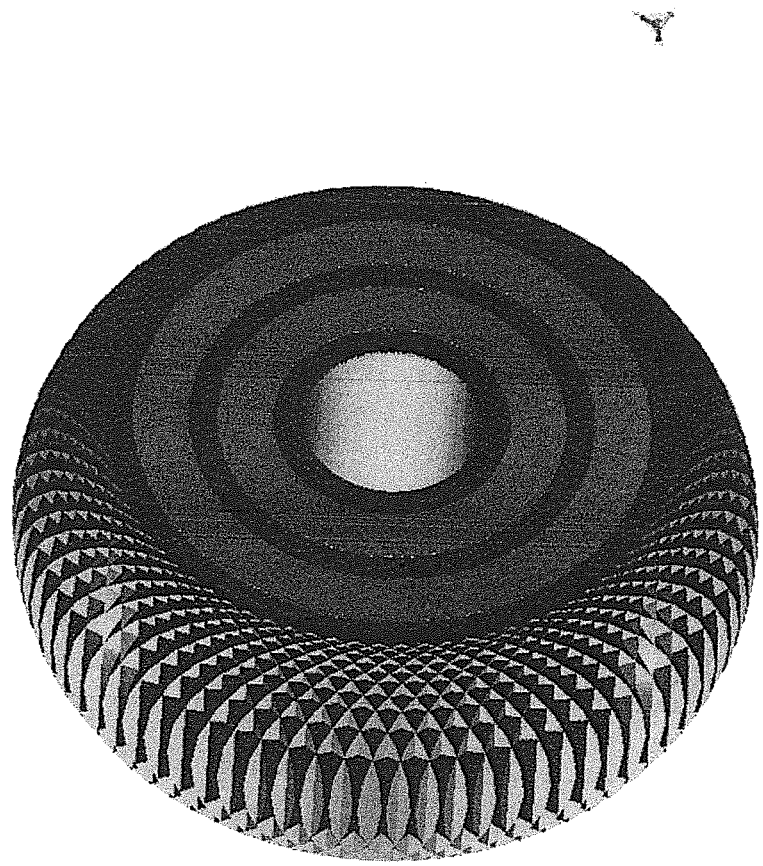

By varying the number of layers, periodicity and perhaps other factors, more advanced NPR structures may be devised. FIG. 13a shows a basic two-layer configuration with positive Poisson ratio (PPR). However, the arrangement of FIG. 13b, uses three layers and N=28 to achieve another configuration. FIG. 14 is an oblique representation of the quasi-3D embodiment of FIG. 13b. Note that in some embodiments positive Poisson's ratio (PPR) unit cells may be used or mixed with negative Poisson's ratio (NPR) structures. Cell 1302 in FIG. 13a, for example, is a PPR structure, as are all of the cells in FIG. 13b. FIGS. 15, 16, 17 illustrate even more advanced structures realized by varying the sizes and numbers of layers, periodicity, and geometry shapes of tendons and stuffers to arrive at complex unit cell configurations.

Figure 18:
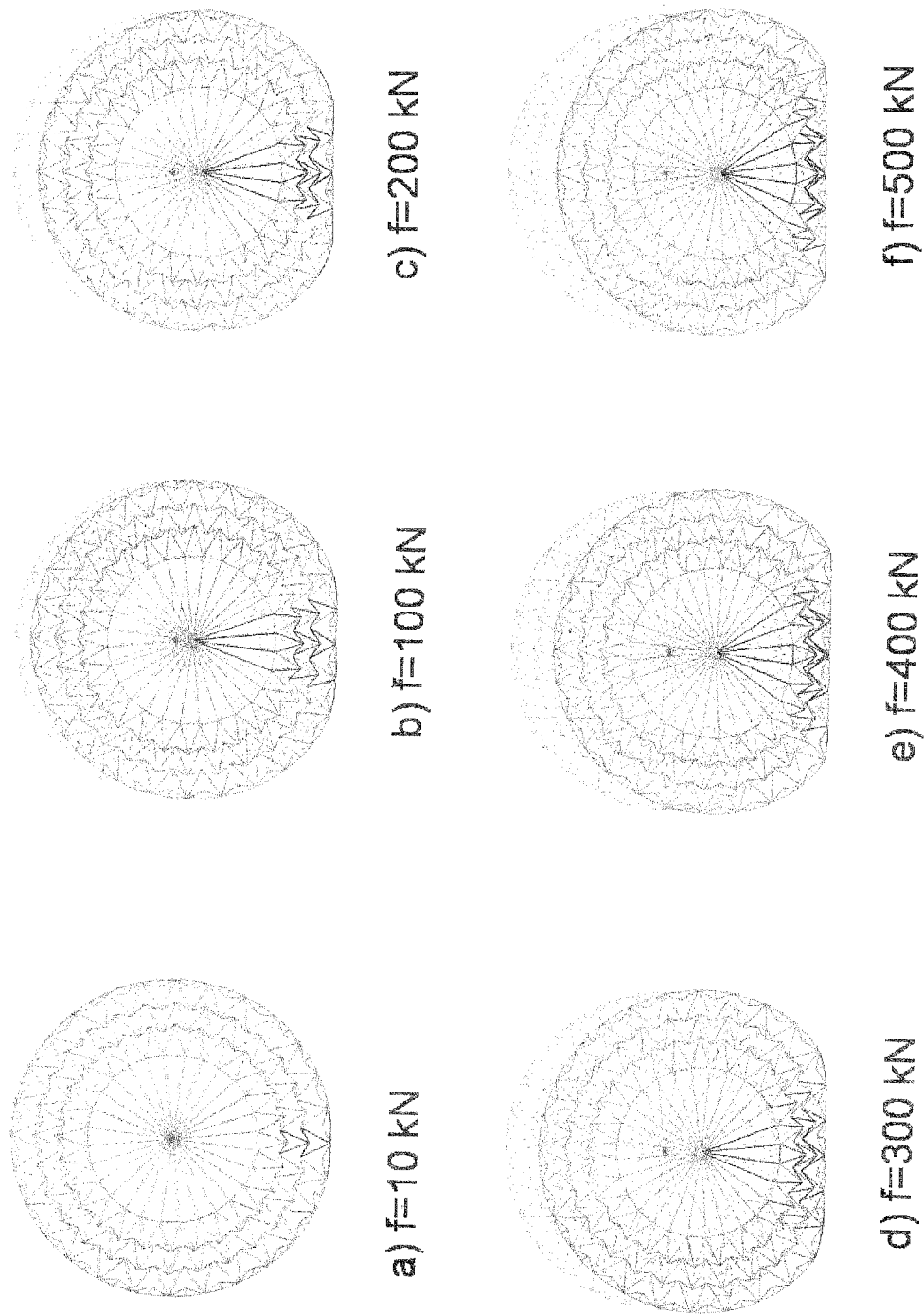
FIG. 18 shows vertical compression virtual tests (computer simulations) at f=10 kN to f=500 kN.
Figure 19:
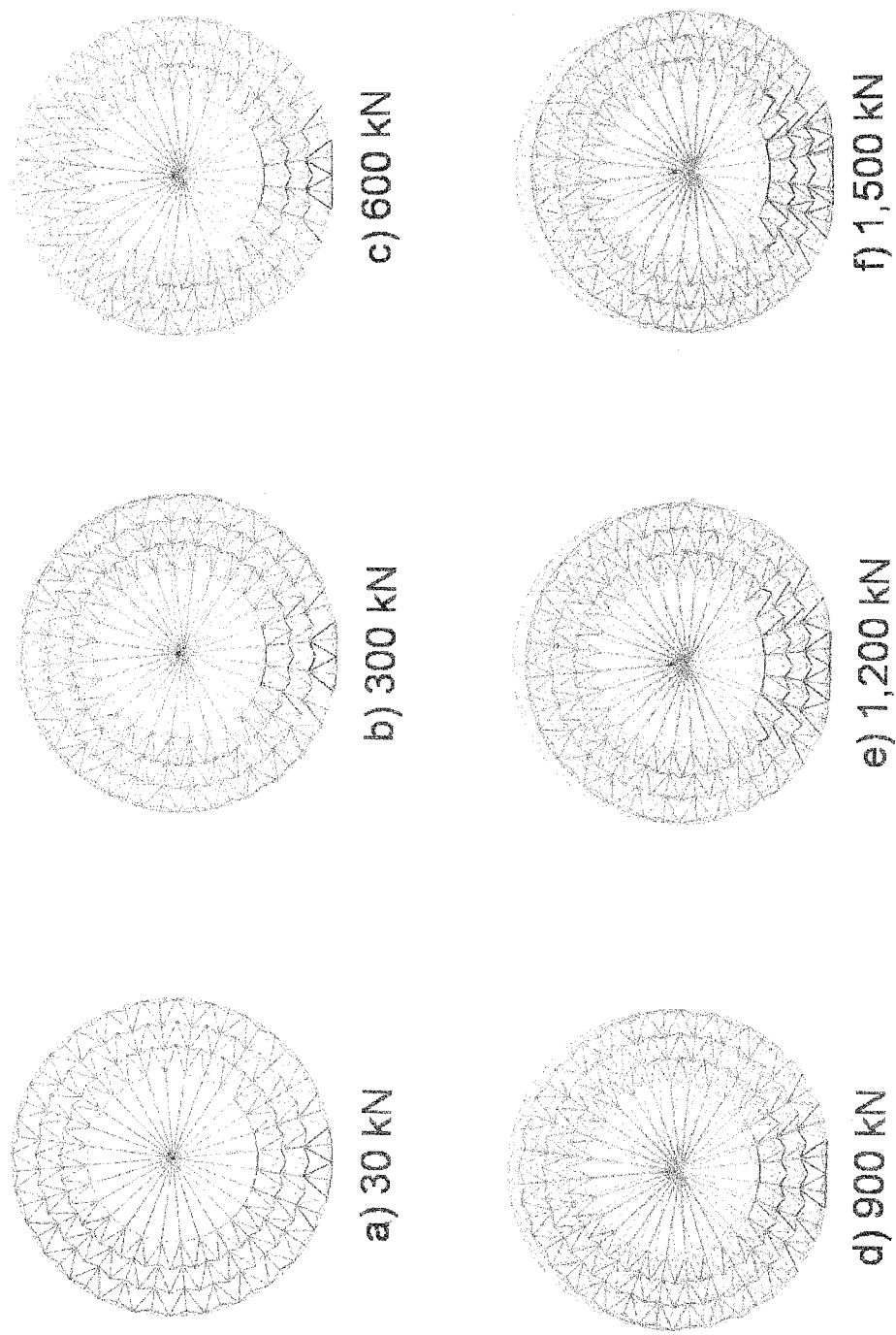
FIG. 19 shows vertical compression virtual tests at f=30 kN to f=1,500 kN.
Figure 20:
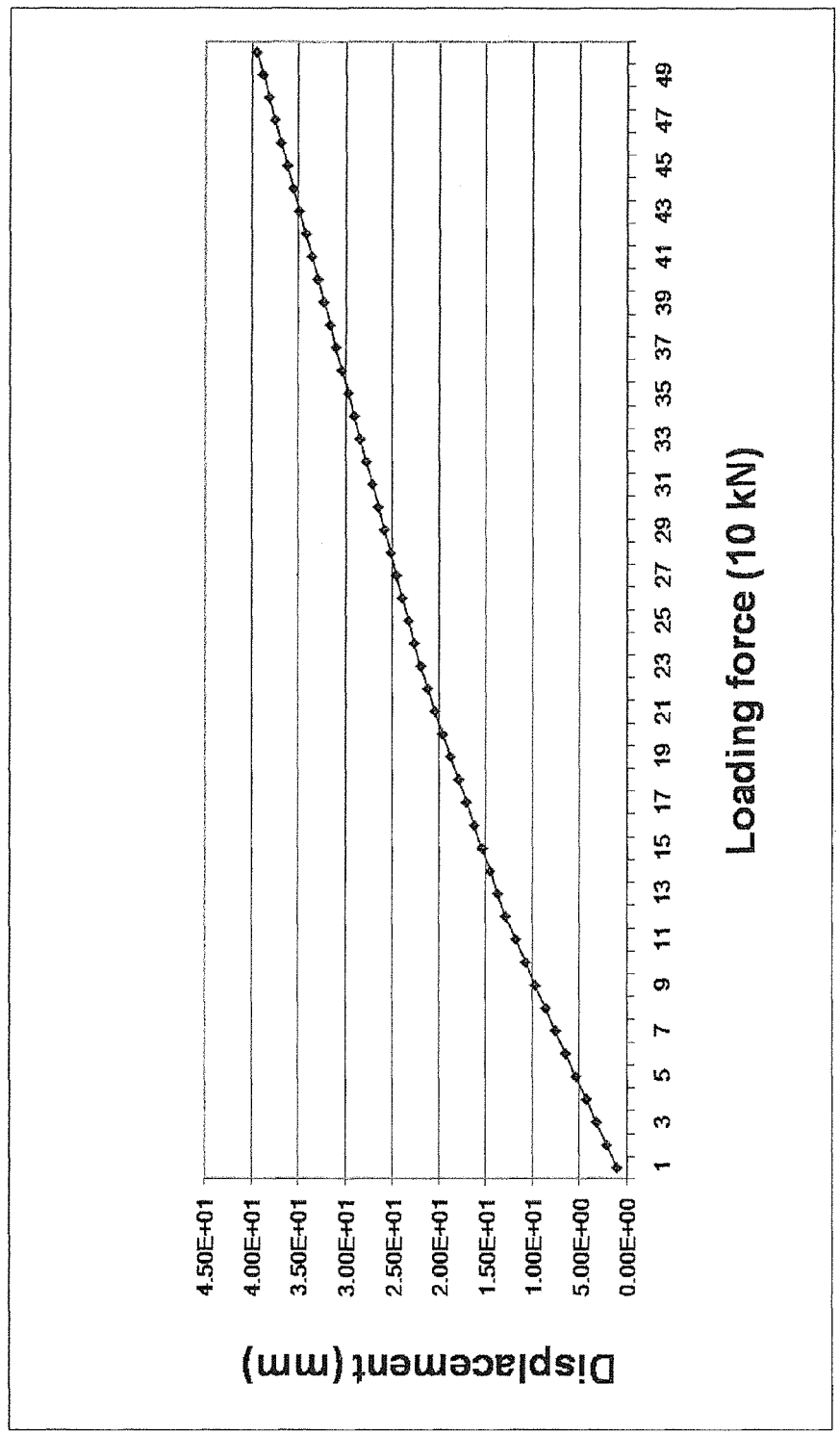
FIG. 20 is a typical load-displacement curve obtained from the computer simulation, again highlighting the stiffening behavior of the NPR-runflat concept.

Preliminary virtual tests using computer simulation have been conducted to measure the vertical stiffness of the proof-of-concept NPR-runflat systems. FIG. 18 shows vertical compression virtual tests at f=10 kN to f=500 kN. FIG. 19 shows vertical compression virtual tests at f=30 kN to f=1,500 kN. The proof-of-concept runflat example can achieve (2,248 lbs) without any permanent deformation. FIG. 20 is a load-displacement curve, again highlighting the stiffening, behavior of the NPR-runflat concept.

We claim:

1. A wheel assembly including a run-flat structure rotatable about an axis of rotation, comprising:
   a plurality of adjacent, concentric rings of unit cells extending radially outwardly from the axis of rotation, each unit cell being constructed of a plurality of members defining a Negative Poisson's Ratio (NPR) structure;
   the outermost ring of unit cells defining a circular form;
   wherein the stiffness of the NPR structure increases in a localized region of loading when the circular form experiences terrain contact; and
   wherein each unit cell comprises a plurality of nested-V shapes.

2. A wheel assembly including a run-flat structure rotatable about an axis of rotation, comprising:
   a plurality of adjacent, concentric rings of unit cells extending radially outwardly from the axis of rotation, each unit cell being constructed of a plurality of members defining a Negative Poisson's Ratio (NPR) structure;
   the outermost ring of unit cells defining a circular form, wherein the stiffness of the NPR structure increases in a localized region of loading when the circular form experiences terrain contact; and
   including a separate layer of different material disposed between each set of adjacent concentric rings of unit cells.

3. A wheel assembly including a run-flat structure rotatable about an axis of rotation, comprising:
   a plurality of adjacent, concentric rings of unit cells extending radially outwardly from the axis of rotation, each unit cell being constructed of a plurality of members defining a Negative Poisson's Ratio (NPR) structure;
   the outermost ring of unit cells defining a circular form, wherein the stiffness of the NPR structure increases in a localized region of loading when the circular form experiences terrain contact;

the number of unit cells within a ring of unit cells being defined as periodicity; and the periodicity is varied in accordance with an application.

4. A wheel assembly including a run-flat structure rotatable about an axis of rotation, comprising:

a plurality of adjacent, concentric rings of unit cells extending radially outwardly from the axis of rotation, each unit cell being constructed of a plurality of members defining a Negative Poisson's Ratio (NPR) structure;

the outermost ring of unit cells defining a circular form, wherein the stiffness of the NPR structure increases in a localized region of loading when the circular form experiences terrain contact;

the number of unit cells within a ring of unit cells defining a height measured radially outwardly from the axis of rotation; and wherein different rings of unit cells have the different heights.

5. A wheel assembly including a run-flat structure rotatable about an axis of rotation, comprising:

a plurality of adjacent, concentric rings of unit cells extending radially outwardly from the axis of rotation, each unit cell being constructed of a plurality of members defining a Negative Poisson's Ratio (NPR) structure;

the outermost ring of unit cells defining a circular form, wherein the stiffness of the NPR structure increases in a localized region of loading when the circular form experiences terrain contact;

each ring of unit cells having a width measured parallel to the axis of rotation; and wherein a single unit cell is disposed width-wise within each ring forming a quasi-three-dimensional NPR structure.

6. A wheel assembly including a run-flat structure rotatable about an axis of rotation, comprising:

a plurality of adjacent, concentric rings of unit cells extending radially outwardly from the axis of rotation, each unit cell being constructed of a plurality of members defining a Negative Poisson's Ratio (NPR) structure;

the outermost ring of unit cells defining a circular form, wherein the stiffness of the NPR structure increases in a localized region of loading when the circular form experiences terrain contact;

each ring of unit cells having a width measured parallel to the axis of rotation; and further including a plurality of interconnected unit cells disposed width-wise within each ring forming a true three-dimensional NPR structure.

7. A wheel assembly including a run-flat structure rotatable about an axis of rotation, comprising:

a plurality of adjacent, concentric rings of unit cells extending radially outwardly from the axis of rotation, each unit cell being constructed of a plurality of members defining a Negative Poisson's Ratio (NPR) structure;

the outermost ring of unit cells defining a circular form, wherein the stiffness of the NPR structure increases in a localized region of loading when the circular form experiences terrain contact;

each unit cell comprising interconnected first and second V-shapes defining different angles; and wherein the angles of the first and second V-shapes vary from ring to ring.

8. A wheel assembly including a run-flat structure rotatable about an axis of rotation, comprising:

a plurality of adjacent, concentric rings of unit cells extending radially outwardly from the axis of rotation, each unit cell being constructed of a plurality of members defining, a Negative Poisson's Ratio (NPR) structure;

the outermost ring of unit cells defining a circular form, wherein the stiffness of the NPR structure increases in a localized region of loading when the circular form experiences terrain contact; and wherein the members defining the NPR structure are constructed from steel and aramid fibers.

* * * * *